United States Patent [19]

Oosterwal

[11] Patent Number: 4,850,239
[45] Date of Patent: Jul. 25, 1989

[54] STEERING WHEEL HUB AND UPPER STEERING SHAFT ASSEMBLY FOR TILT HEAD STEERING COLUMNS

[75] Inventor: Dantar P. Oosterwal, Saginaw, Mich.

[73] Assignee: General Motors Corporation, Detroit, Mich.

[21] Appl. No.: 150,212

[22] Filed: Jan. 29, 1988

[51] Int. Cl.$^4$ .............................................. B62D 1/18
[52] U.S. Cl. ....................................................... 74/493
[58] Field of Search ......................................... 74/493

[56] References Cited

U.S. PATENT DOCUMENTS

| | | | |
|---|---|---|---|
| 4,029,168 | 6/1977 | Kramer | 180/114 |
| 4,300,407 | 11/1981 | Köpf | 74/493 |
| 4,475,744 | 10/1984 | Leutz | 280/775 |
| 4,530,254 | 7/1985 | Toyoda et al. | 74/493 |
| 4,538,478 | 9/1985 | Sato et al. | 74/493 |
| 4,660,673 | 4/1987 | Yoshii | 180/334 |

FOREIGN PATENT DOCUMENTS 3241575 5/1983 Fed. Rep. of Germany ........ 74/493
3410568 10/1984 Fed. Rep. of Germany ........ 74/493

*Primary Examiner*—Leslie A. Braun
*Assistant Examiner*—Scott Anchell
*Attorney, Agent, or Firm*—Charles R. White

[57] ABSTRACT

This integrated wheel hub and upper steering shaft assembly foreshortens the steeing column and steering wheel assembly. The connection of the steering wheel to the upper steering shaft between the upper and lower bearings of the bearing housing allows the angularly adjustable head to be tilted with the wheel hub closer to the point of the pivot. This provides for foreshortened steering column length while retaining effective energy absorbing stroke for use in a side range of vehicle applications including those with short fore/aft space for column installation.

1 Claim, 1 Drawing Sheet

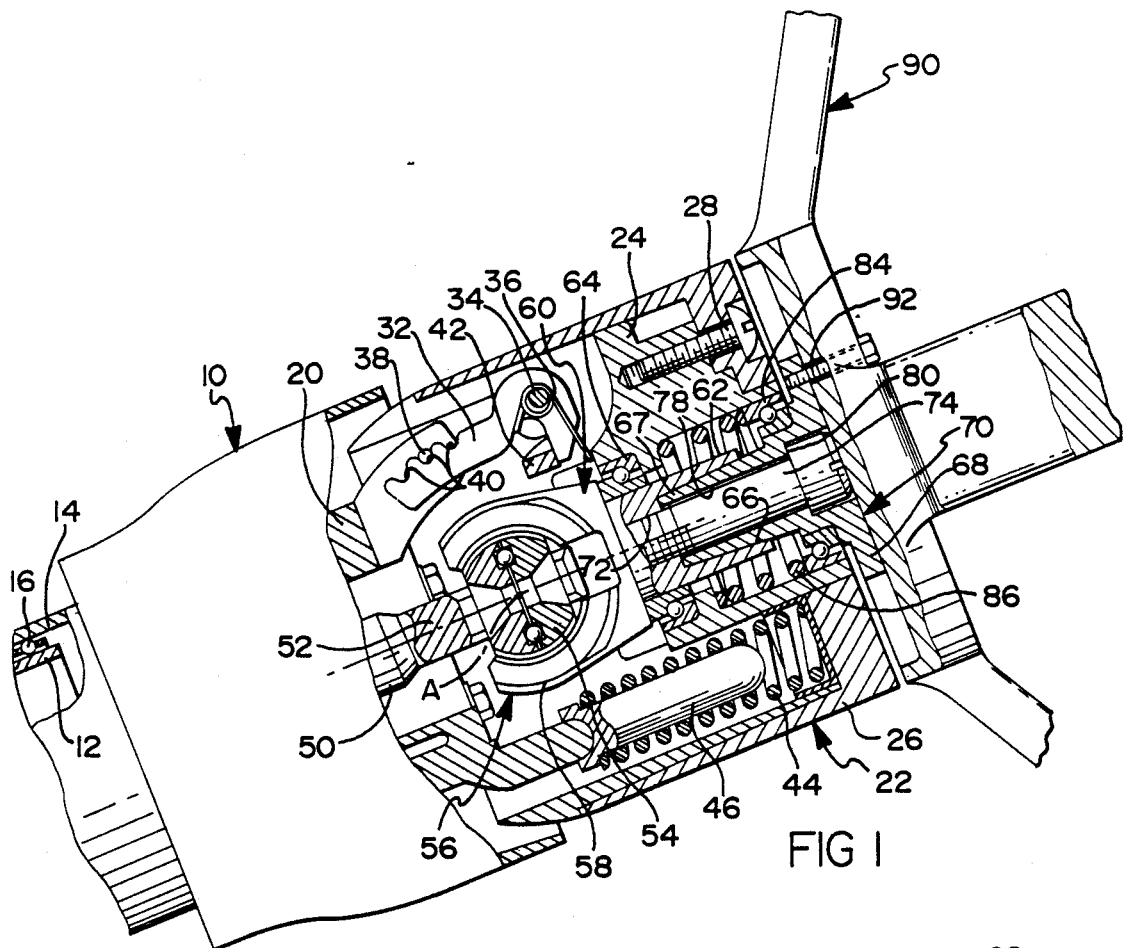
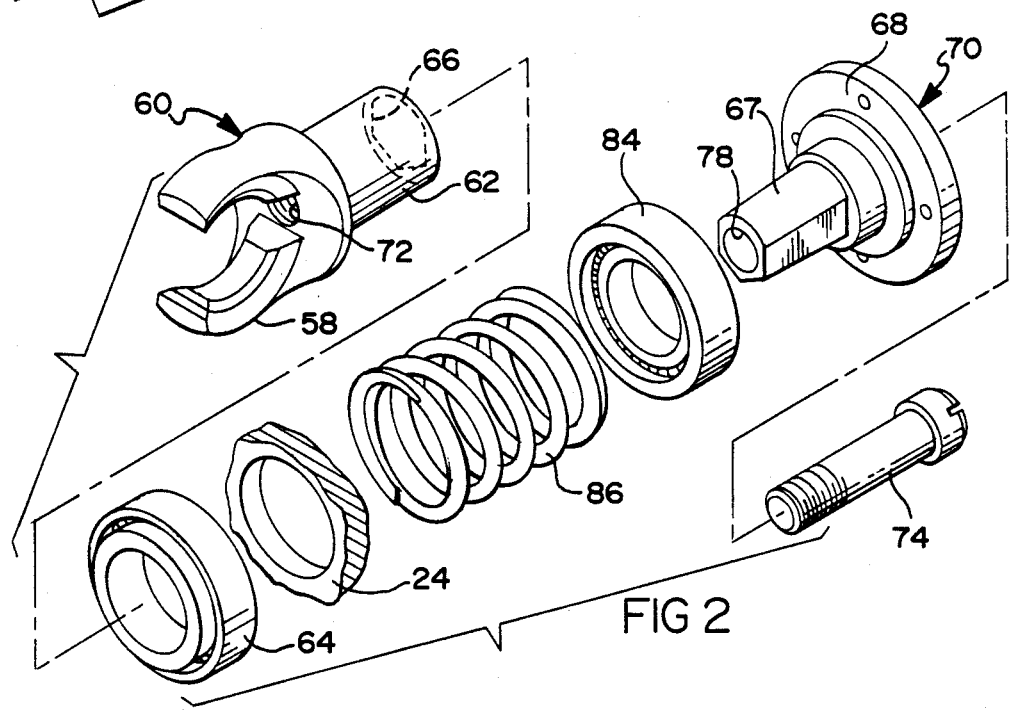
FIG 1
FIG 2

STEERING WHEEL HUB AND UPPER STEERING SHAFT ASSEMBLY FOR TILT HEAD STEERING COLUMNS

This invention relates to vehicle steering columns and more particularly to a new and improved tiltable steering wheel and upper steering shaft assembly featuring mating and interlocked parts within the confines of the bearing housing of a tilt head to foreshorten overall steering column length while providing a new and improved connection between the upper steering shaft and the steering wheel.

Various steering columns having a fixed length for energy absorbing purposes, utilize upper and lower steering shafts interconnected by a torque transmitting ball joint to permit the head and upper shaft to be tilted with respect to the lower shaft and a support fixed within a mast jacket assembly of the steering column. In these columns, the steering wheel is mounted atop of the upper steering shaft projecting from the upper end of the tilt head. Many of these tilt head columns are not readily usable in vehicles having limited column space since a predetermined column length is needed for energy absorption operations and with such length the steering wheel would crowd the vehicle operator.

An illustrative column with a tilt head having upper and lower steering shafts is disclosed in U.S. Pat. No. 4,029,168, issued to R. L. Kramer, entitled STEERING COLUMN LOCK INHIBITOR, assigned to the assignee of this invention and hereby incorporated by reference. The present invention is of the general category of that disclosed in the U.S. patent to Kramer referenced above but provides a new and improved upper shaft and hub steering wheel assembly which has telescoped and rotationally interlocked components rigidly secured together to provide a foreshortened steering shaft and wheel hub assembly that can be readily used in a wide range of vehicle applications and especially those that have minimized fore-aft column space so that there can be sufficient stroke for effective energy absorption.

In the preferred embodiment of the preferred invention, there a steering wheel has a special hub which provides an integrated connection with the upper steering shaft forming an assembly which foreshortens the length of the steering column and steering wheel assembly. This connection in effect allows the steering wheel to be connected to the upper steering shaft between upper and lower shaft bearings in the tilt head of the steering column as opposed to being mounted atop of an upper steering shaft extending from the tilt head. The integrated wheel to upper steering shaft connection of the present invention is such that the steering wheel is placed closer to the angulation point of a tilt head so that the vehicle operator will not be crowded by the wheel. This connection foreshortens the installation length required for energy absorbing columns so that the column can be used in a wide range of vehicles while providing effective energy absorption capability.

These and other features, objects and advantages of this invention will become more apparent from the following detailed description and drawing in which:

FIG. 1 is a side view primarily in cross section of a tilt head steering column for use in automotive applications.

FIG. 2 is an exploded view of the integrated steering wheel and upper steering shaft connection of the present invention.

Turning now in greater detail to the drawings, there is shown in FIG. 1, a steering column assembly 10 supported within a vehicle for steering the dirigible road wheels thereof. The steering column assembly has conventional lower and upper tubular mast jackets 12 and 14 mounted for telescoping movement in an energy absorbing mode of operation. Operatively interposed between the lower and upper mast jacket 12 and 14 is a deformer ball and sleeve assembly 16 which works the material of these sleeves to absorb energy of impact load effecting the telescopic collapse of the mast jacket as is well known in this art. Secured by screws or other suitable fasteners in the upper end of the upper jacket is a support 20 for a tilt head assembly 22. The tilt head assembly includes a generally cylindrical bearing housing 24 conventionally connected to support 20 by trunnion-like pivot pins, such as disclosed in the above referenced U.S. Pat. No. 4,029,168, for pivotal movement with respect to horizontal axis "A". An inverted cup-like cover 26 encases the bearing housing 24 and is secured thereto by threaded fasteners 28 which extends through the upper end of the cover into threaded connection with the bearing housing. The inner end of the bearing housing 24 pivotally supports a locking dog 32 by pin 34. A torsion spring 36 also mounted on pin 34, having one arm grounded on an end surface of the bearing housing and the other arm seated against an extending leg of the locking dog, urges the locking dog clockwise so that a locking pin 38 carried by the support is engaged by a selected one of the arcuately arranged notches 40 in the extending leg of the locking dog to fix the angle of the tilt head assembly. A tilt lever 42 is pivotally mounted in the tilt head assembly and is manually turned by the vehicle operator to move the locking dog off of the locking pin 38 so that a new tilt head position may be selected in a conventional manner. A helical compression spring 44 is mounted on a finger-like guide 46 and operatively between the support and the cover as shown in FIG. 1 to provide a spring force to pivot the tilt head assembly 22 upwardly when the locking dog is moved to the release position by lever 42. When the selected position is obtained, the lever 42 is released and the locking dog will be urged by torsion spring so that the appropriate notch will mate with the locking pin 38. Accordingly, the tilt head is fixed at the selected angle.

A lower steering shaft 50, drivingly connected by shaft means to vehicle steering gear, not shown, extends upwardly through the lower and upper mast jackets 12 and 14 into a conventional shaped socket forming the upper end thereof. This socket pivots in an associated first groove of a ball or sphere 54 of a torque transmitting universal joint 56. A second C-shaped socket 58 is formed on the lower end of an upper steering shaft 60 and pivots in a second groove in the ball 54 located at 90° with respect to the first groove. With this conventional arrangement, the upper shaft can be tilted with respect to the lower shaft and steering torque 15 transmitted between these shafts. The upper steering shaft has a reduced diameter shank 62 that extends upwardly from head portion 58 into the bearing housing 24. A lower bearing assembly 64 is operatively mounted between the upper steering shaft and the shouldered shank of the upper steering shaft 60 to rotatably support shaft 60 in the bearing housing. The shank 62 terminates within the bearing housing and is formed with a polygonal-shaped socket 66 therein which receives an elongated key 67 projecting downwardly from a disk-like head 68 of a wheel hub 70. The key has a polygonal cross section shape to drivingly fit in socket 66 of the upper steering shaft. The upper steering shaft has a counter bore 72 internally threaded to receive the threaded connector 74 inserted through an axial passage 78 in wheel hub 70. A counterbore 80 in the head of the wheel hub 68 receives the head of screw 74 so that it is flush. In the FIG. 1 position, fastener 74 tightly secures the wheel hub and upper steering shaft together so that these parts are rotatably interlocked. An upper bearing 84 seated on shoulder of the hub 70 rotatably supports the hub within the bearing housing 24. A spring 86 seated in the bearing housing engages the upper bearing 84 and provides a preload force thereon. A steering wheel 90 is secured to the wheel hub 70 by suitable threaded fasteners 92 which thread into head of the wheel hub as shown in FIG. 1 to form steering wheel assembly.

With this arrangement, it will be appreciated that the wheel hub 70 is in effect joined to the shank of the upper steering shaft by a mating key and socket so that the requirement for conventional splined connection between the steering wheel 90 has been replaced and so that the wheel has been moved downwardly and located closer to the pivot point A of the tilt head. With the distance between the steering wheel and the pivot point reduced the column is suitable for vehicle applications in where the fore/aft steering column space is limited. Furthermore, the energy absorption construction 12 remains the same and there is sufficient space for convenient seating and steering wheel tilt operation by the vehicle operator.

In this invention, the female taper does not necessarily need to be on the shaft. It could be on the wheel hub. Also, the socket is not necessarily polygonal, i.e., it could be oval. Furthermore, the steering wheel does not need to be bolted to the hub. The wheel spokes could be welded to the hub.

The above described preferred embodiment of the invention is illustrative of the present invention which is modified by the scope of the appended claims.

The embodiments of the invention in which an exclusive property or privilege is claimed are defined as follows:

1. In a steering column having
   a tubular mast jacket assembly including an upper mast jacket and a lower mast jacket and an energy absorber disposed between said upper and said lower mast jackets,
   a lower steering shaft rotatably supported within said mast jacket assembly with a first end thereof outside a first end of said upper mast jacket, and
   a bearing housing mounted on said first end of said upper mast jacket for pivotal movement relative to said upper mast jacket about a transverse axis of said upper mast jacket,
   the combination comprising:
   means defining a cylindrical bore in said bearing housing,
   means defining an internal annular shoulder in said bore between opposite ends thereof,
   an upper steering shaft disposed in said cylindrical bore with a first end thereof between said opposite ends of said bore and a non-cylindrical internal socket extending from said first end thereof toward a second end thereof,
   universal joint means connecting said second end of said upper steering shaft to said first end of said lower steering shaft so that said upper and said lower steering shafts are rotatable as a unit and relatively tiltable about said transverse axis of said mast jacket,
   a first bearing rotatably supporting said upper steering shaft on said bearing housing and including an inner race on said upper steering shaft and an outer race in said bore on a first side of said internal annular shoulder,
   a wheel hub having a flat disk-like head and an integral elongated non-cylindrical key extending from said disk-like head perpendicular to the plane thereof and into said non-cylindrical socket in said upper steering shaft whereby said upper steering shaft and said wheel hub are joined for unitary rotation,
   a bolt extending through said wheel hub and threaded into said upper steering shaft to prevent withdrawal of said non-cylindrical key from said non-cylindrical socket,
   a second bearing rotatably supporting said wheel hub on said bearing housing and including an inner race on said wheel hub and an outer race in said bore on a second side of said internal annular shoulder, and
   a preload spring in said bore around said upper steering shaft and said wheel hub having a first end seated against said internal annular shoulder and a second end seated against said outer race of said second bearing.

* * * * *